US012365203B2

(12) United States Patent
Duchemin et al.

(10) Patent No.: US 12,365,203 B2
(45) Date of Patent: Jul. 22, 2025

(54) TIRE COMPRISING A SINGLE CARCASS PLY WITH REDUCED DEFORMATION DEPTH IN THE SIDEWALL AFTER RUNNING IN

(71) Applicant: COMPAGNIE GENERALE DES ETABLISSEMENTS MICHELIN, Clermont-Ferrand (FR)

(72) Inventors: Sylvie Duchemin, Clermont-Ferrand (FR); Nizar Didane, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 629 days.

(21) Appl. No.: 16/982,270

(22) PCT Filed: Mar. 15, 2019

(86) PCT No.: PCT/FR2019/050584
§ 371 (c)(1),
(2) Date: Sep. 18, 2020

(87) PCT Pub. No.: WO2019/180352
PCT Pub. Date: Sep. 26, 2019

(65) Prior Publication Data
US 2021/0053398 A1    Feb. 25, 2021

(30) Foreign Application Priority Data

Mar. 20, 2018   (FR) .................................... 1852368

(51) Int. Cl.
*B60C 9/00*        (2006.01)
*B60C 3/00*        (2006.01)
(Continued)

(52) U.S. Cl.
CPC .............. *B60C 9/005* (2013.01); *B60C 3/00* (2013.01); *B60C 3/04* (2013.01); *B60C 9/0042* (2013.01);
(Continued)

(58) Field of Classification Search
None
See application file for complete search history.

(56) References Cited

U.S. PATENT DOCUMENTS 3,554,261 A * 1/1971 Mirtain ..................... B60C 9/09
4,155,394 A * 5/1979 Shepherd ............... B60C 9/005
(Continued)

FOREIGN PATENT DOCUMENTS

EP          3287299 A1    2/2018
JP       05024410 A  *   2/1993
(Continued)

OTHER PUBLICATIONS

English machine translation of JP 5-24410 A, Feb. 2, 1993.*
English machine translation of EP 3 287 299 A1, Feb. 28, 2018.*
The Old Timer's Tire Guide, 6th ed., Tire Guides, Inc., Boca Raton, Florida, 2001, pp. 308-309 and 313.*
Gent, Alan Neville and Walter, Joseph D., The Pneumatic Tire, US Department of Transportation, Feb. 2006, pp. 662-663.*
International Search Report dated Jul. 2, 2019, in corresponding PCT/FR2019/050584 (5 pages).

*Primary Examiner* — Adrienne C. Johnstone
(74) *Attorney, Agent, or Firm* — VENABLE LLP (57) ABSTRACT

A tire (10) comprises a crown (12) comprising a tread (20), a crown reinforcement (14), two sidewalls (22), two beads (24), with each sidewall (22) connecting each bead (24) to the crown (12), the crown reinforcement (14) extending into the crown (12). The tire (10) comprises a radial carcass reinforcement (32) anchored in each of the beads (24) and extending into the sidewalls (22), and the crown reinforcement (14) is radially inserted between the carcass reinforcement (32) and the tread (20). The tire (10) has a sidewall height that is greater than or equal to 110 mm and a load index that is greater than or equal to 94. The carcass reinforcement (32) comprises a single carcass ply (34)

(Continued)

comprising at least one reinforcer element comprising an assembly formed by: a multifilament strand made of aromatic polyamide or aromatic co-polyamide; and a multifilament strand made of polyester.

14 Claims, 6 Drawing Sheets (51) Int. Cl.
  *B60C 3/04* (2006.01)
  *B60C 9/04* (2006.01)
  *B60C 9/08* (2006.01)
(52) U.S. Cl.
  CPC .................. *B60C 9/04* (2013.01); *B60C 9/08* (2013.01); *B60C 2009/0092* (2013.01); *B60C 2009/0466* (2013.01); *B60C 2009/0475* (2013.01)

(56) References Cited

U.S. PATENT DOCUMENTS

| | | |
|---|---|---|
| 2015/0202924 A1 | 7/2015 | Pirotte et al. |
| 2015/0239301 A1 | 8/2015 | Vallet et al. |
| 2016/0193874 A1 | 7/2016 | Asano et al. |
| 2021/0207295 A1* | 7/2021 | Lee .......................... B60C 9/005 |

FOREIGN PATENT DOCUMENTS

| | | |
|---|---|---|
| WO | 2014/057082 A1 | 4/2014 |
| WO | WO-2018/062960 A1 * | 4/2018 |

* cited by examiner

PRIOR ART

TIRE COMPRISING A SINGLE CARCASS PLY WITH REDUCED DEFORMATION DEPTH IN THE SIDEWALL AFTER RUNNING IN

BACKGROUND

The invention relates to a tyre comprising a carcass reinforcement comprising a single carcass ply comprising a reinforcer element comprising at least one multifilament strand made of aromatic polyamide or aromatic co-polyamide and at least one multifilament strand made of polyester assembled together.

Although it is not limited to this type of application, the invention will be more specifically described with reference to a tyre intended to be fitted on vehicles of the "SUV" ("Sport Utility Vehicle") type or "light truck" type such as, for example, trucks or vans intended to carry heavy loads.

A tyre is known from the prior art that is intended to be fitted on vehicles of the SUV type that is marketed by MICHELIN and forms part of the Latitude Tour HP range and has 255/50R19 107 W XL TL size characteristics. Such a tyre comprises a crown comprising a tread and a crown reinforcement, two sidewalls, two beads, with each sidewall connecting each bead to the crown. The crown reinforcement extends into the crown in a circumferential direction of the tyre. The tyre comprises a radial carcass reinforcement anchored in each of the beads and extending into the sidewalls and the crown. The crown reinforcement is radially inserted between the carcass reinforcement and the tread.

In order to carry a relatively heavy load associated with the unladen weight of the vehicle for which the tyre is intended, the tyre has, on the one hand, a sidewall height that is greater than or equal to 110 mm, in this case equal to 128 mm, and a load index that is greater than or equal to 94, and in this case is equal to 107, and, on the other hand, is such that the carcass reinforcement comprises two carcass plies, each comprising a plurality of reinforcer elements.

Each reinforcer element comprises a balanced assembly formed by two multifilament strands made of polyester assembled together and helically wound around one another with a twist rate of 290 revolutions per metre. Each multifilament strand has a count equal to 144 tex. Such a tyre of the prior art, due to the two carcass plies thereof, is relatively heavy and hysteretic, which confers relatively high rolling resistance thereto, which is detrimental to the fuel consumption of the vehicle on which it is fitted.

Figure 1:
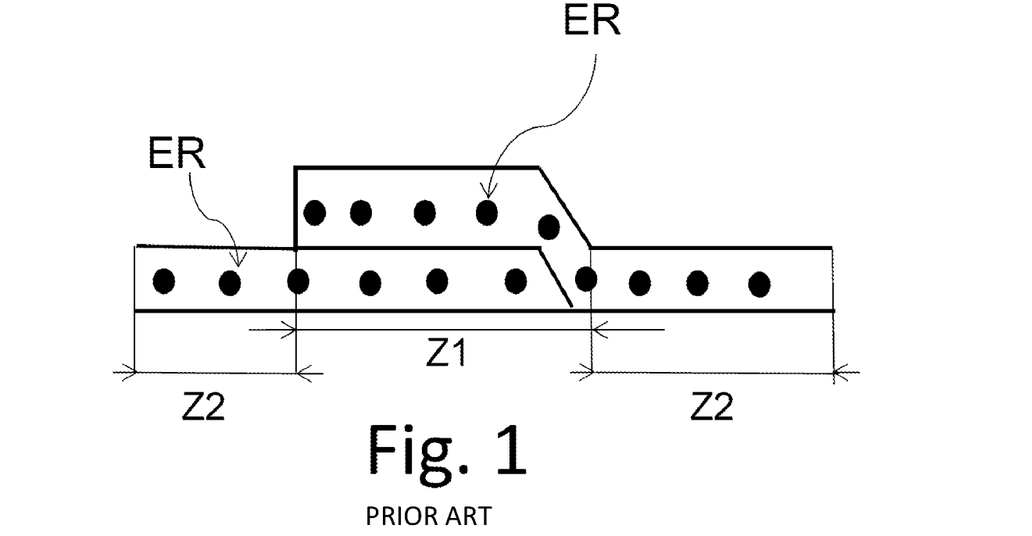
FIG. 1, previously described to explain the problem of sidewall deformations, is a section view of a carcass ply comprising reinforcer elements during the tyre manufacturing method, with the section being perpendicular to the reinforcer elements.
Figure 3:
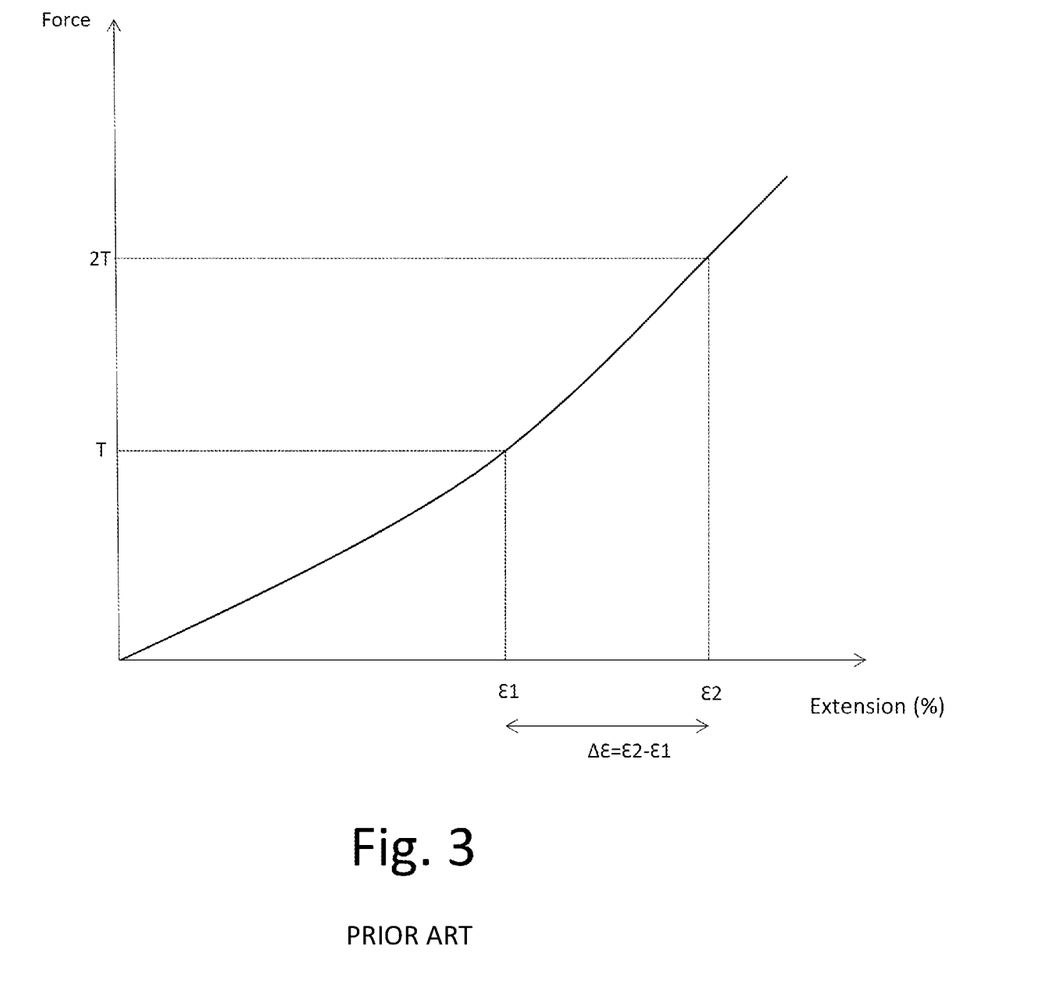
FIG. 3, previously described to explain the problem of sidewall deformations, is a force-extension curve of a reinforcer element of the carcass ply of FIGS. 1 and 2.

Furthermore, in general, during the method for manufacturing the tyres, each carcass ply is wound on and around a shaping drum, with each carcass ply then having two free ends. The two free ends of each ply are then fused by overlaying (and not by butt joining of the two free ends) the two free ends one on top of the other over a length of the order of one centimetre, in order to form an overlaying zone Z1. As illustrated in FIG. 1, in each overlaying zone Z1, each carcass ply has a dual thickness and therefore a density $2de$ of reinforcer elements RE that is two times higher than the adjacent zones Z2, in which each carcass ply has a single thickness and therefore a density de of reinforcer elements RE. FIG. 3 shows a force-extension curve of a reinforcer element of the carcass reinforcement of the tyre of the prior art. In the case of a given stress, each reinforcer element of each adjacent zone absorbs a tension $2T$ generating an extension $\varepsilon 2$ of each reinforcer element within this adjacent zone Z2, whereas, in each overlaying zone Z1, due to a density $2d$ of reinforcer elements, each reinforcer element of each overlaying zone Z1 absorbs a tension T generating an extension $\varepsilon 1$ of each reinforcer element within this overlaying zone Z1, with the extension $\varepsilon 1$ being less than $\varepsilon 2$.

Figure 2:
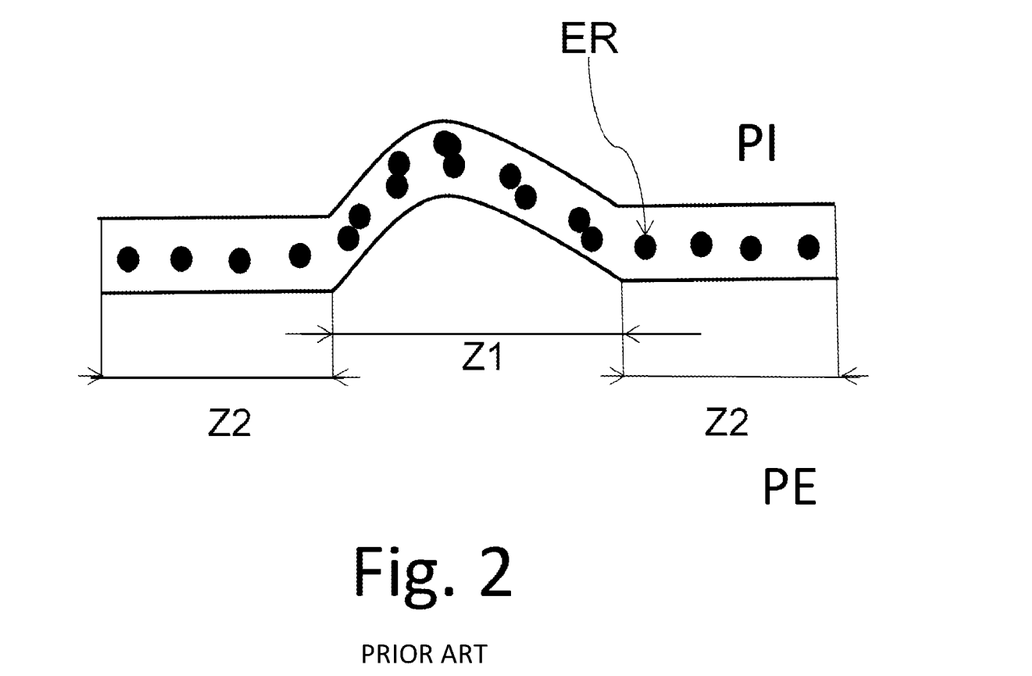
FIG. 2, previously described to explain the problem of sidewall deformations, is a view similar to that of FIG. 1 on completion of the tyre manufacturing method.

As shown in FIG. 2, this difference between $\varepsilon 1$ and $\varepsilon 2$, called $\Delta\varepsilon$, causes, once the tyre is inflated to the pressure PI and the reinforcer elements are tensioned, a relatively high difference in extension between the reinforcer elements of each of these zones creating, viewed from outside the tyre, at the outside pressure OP, a hollow in each sidewall of the tyre, with this hollow forming an unsightly deformation.

This deformation is even greater when the nominal inflation pressure is higher, with such a pressure being necessary for carrying heavy loads. This deformation is even higher when the sidewall height is high. The sidewall heights that are greater than or equal to 110 mm thus are particularly susceptible to the appearance of these deformations. Such deformations, even though they are only unsightly, result in numerous customer returns since the deformation exceeds the perception threshold of the human eye. Even though this problem is not present on the tyre of the prior art described above due to the fact that it comprises two carcass plies, it is important that all manufactured tyres are not returned by clients due to these deformations, even if they have no effect with respect to the performance and the safety of the tyre.

SUMMARY

The aim of the invention is to provide a tyre that is particularly intended to be fitted on vehicles of the SUV type or light truck type, with a reduced mass and not having unsightly defects that are unacceptable for the client.

To this end, the aim of the invention is a tyre comprising a crown comprising a tread and a crown reinforcement, two sidewalls, two beads, with each sidewall connecting each bead to the crown, the crown reinforcement extending into the crown in a circumferential direction of the tyre, the tyre comprising a radial carcass reinforcement anchored in each of the beads and extending into the sidewalls, the crown reinforcement being radially inserted between the carcass reinforcement and the tread, the tyre having a sidewall height that is greater than or equal to 110 mm and a load index that is greater than or equal to 94, wherein the radial carcass reinforcement comprises a single carcass ply comprising at least one reinforcer element comprising an assembly formed by a plurality of multifilament strands comprising:

at least one multifilament strand made of aromatic polyamide or aromatic co-polyamide; and
at least one multifilament strand made of polyester.

On the one hand, the carcass reinforcement of the tyre according to the invention comprises a single carcass ply. Thus, the carcass reinforcement, apart from the carcass ply, does not have any ply reinforced by wire reinforcer elements. The wire reinforcer elements of such reinforced plies excluded from the carcass reinforcement of the tyre include the metal wire reinforcer elements and the textile wire reinforcer elements. In a highly preferable manner, the carcass reinforcement is formed by a carcass ply. In other words, the carcass reinforcement is formed by a single carcass ply. The use of a hybrid reinforcer element comprising an assembly of monofilaments made of aromatic polyamide or aromatic co-polyamide and monofilaments made of polyester allows a carcass ply to be obtained that has mechanical resistance properties, in particular breaking strength and durability that is high enough to allow the tyre designer to limit the number of carcass plies in the carcass reinforcement to a single (and not several) carcass plies.

Thus, the use of hybrid reinforcer elements as defined above allows a carcass ply to be obtained that has a ply breaking strength that is sufficient for carrying heavy loads, whether this is due to the high unladen weight of the vehicle or due to the total high laden weight of the vehicle. Furthermore, by reducing the number of carcass plies, the cost, the mass and also the hysteresis, and therefore the rolling resistance of the tyre, are reduced.

One effect of reducing the number of carcass plies is to make the tyre according to the invention more sensitive to the presence of deformations in the sidewall on completion of its manufacturing method. Thus, the inventors have noted that the depth of the deformations in the sidewall that are observed on the tyre according to the invention, on completion of its manufacturing method, when it does not exceed the perception threshold of the human eye, which is approximately equal to 600 µm, is relatively high. However, completely unexpectedly, the depth of the deformations decreases following a relatively short period of running-in the tyre according to the invention and it is below the perception threshold of the human eye on completion of this running-in, which limits and even avoids any customer returns. The inventors assume that after running-in, the modulus of the force-extension curve of each reinforcer element increases so that the difference between $\varepsilon 2$ and $\varepsilon 1$ decreases and therefore so that the depth of the deformation decreases.

Therefore, the invention involves combining a single carcass ply and a hybrid reinforcer element, allowing the tyre to be lightened, whilst making the deformations of sidewalls invisible to the client after a running-in period.

Finally, the presence of a single carcass ply allows a tyre to be obtained, the carcass reinforcement of which is more flexible than for a tyre with a carcass reinforcement that comprises a plurality of carcass plies. Thus, the vertical stiffness of the tyre is limited, and consequently so is the comfort of the vehicle on which the tyre is fitted.

A filament made of aromatic polyamide or aromatic co-polyamide is well known to be a filament of linear macromolecules formed by aromatic groups bonded together by amide bonds, at least 85% of which are directly bonded on two aromatic cores, and more specifically poly(p-phenylene terephthalamide) (or PPTA) fibres, for a long time manufactured from optically anisotropic spinning compositions. The following can be cited from among aromatic polyamides or aromatic co-polyamides: polyaryl amides (or PAA, particularly known by the Solvay company trade name Ixef), poly(metaxylylene adipamide), polyphthalamides (or PPA, particularly known by the Solvay company trade name Amodel), amorphous semi-aromatic polyamides (or PA 6-3T, particularly known by the Evonik company trade name Trogamid), meta-aramids (or poly(metaphenylene, isophthalamide or PA MPD-I, particularly known by the Du Pont de Nemours company trade name Nomex) or para-aramids (or poly(paraphenylene terephthalamide or PA PPD-T, particularly known by the Du Pont de Nemours company trade name Kevlar or the Teijin company trade name Twaron).

A filament made of polyester is understood to be a filament of linear macromolecules formed by groups bonded together by ester bonds. The polyesters are manufactured by polycondensation by esterification between a dicarboxylic acid or one of the derivatives thereof, a diol. For example, the polyethylene terephthalate can be manufactured by polycondensation of terephthalic acid and of ethylene glycol. The following can be cited from known polyesters: polyethylene terephthalate (PET), polyethylene naphthalate (PEN), polybutylene terephthalate (PBT), polybutylene naphthalate (PBN), polypropylene terephthalate (PPT) or polypropylene naphthalate (PPN).

The sidewall height is understood to be the section height that is half the difference between the outer diameter of the tyre and the nominal diameter of the rim, as defined in the document, "Engineering Design Information", 2017, by ETRTO (European Tyre and Rim Technical Organisation), General Information, page GI.5. Another way of determining the sidewall height is to multiply the nominal aspect ratio by the nominal section width and by dividing it by 100, as defined in the document, "Engineering Design Information", 2017, by ETRTO (European Tyre and Rim Technical Organisation), General Information, page GI.7.

The load index is understood to be a digital code associated with the maximum load that can be carried by a tyre at the speed indicated by its speed code in the operating conditions specified by the tyre manufacturer, as defined in the document, "Standards Manual", 2017, by ETRTO (European Tyre and Rim Technical Organisation), General Information, page G.7.

A radial carcass reinforcement is understood to mean that each carcass reinforcer element forms an angle ranging from 80° to 90° with the circumferential direction of the tyre in the equatorial circumferential plane of the tyre. In other words, each carcass reinforcer element forms an angle ranging from 80° to 90° with the circumferential direction of the tyre in each sidewall, in other words, the carcass reinforcement is radial in each sidewall.

In one embodiment, the carcass reinforcement also extends into the crown.

Preferably, each reinforcer element forms an angle ranging from 80° to 90° with the circumferential direction of the tyre in the median plane of the tyre. In other words, each carcass reinforcer element forms an angle ranging from 80° to 90° with the circumferential direction of the tyre in the crown, in other words, the carcass reinforcement is radial in the crown.

Preferred Embodiments of the Invention

Advantageously, the sidewall height of the tyre is greater than or equal to 120 mm, preferably greater than or equal to 130 mm, and even more preferably greater than or equal to 140 mm.

It is to be noted that the higher the sidewall height, the more liable the tyre is to have deep sidewall deformations on completion of its manufacturing method. However, it has been surprisingly noted that the higher the sidewall height, the more the modulus after running-in the reinforcer elements of a carcass ply is increased in order to reach a value equivalent to the modulus after running-in a reinforcer element of a carcass ply of a tyre with a lower sidewall height, and which is therefore less sensitive to the problem of sidewall deformation.

Advantageously, the sidewall height is less than or equal to 220 mm, preferably less than or equal to 210 mm, and even more preferably less than or equal to 200 mm.

Such sidewall heights are particularly adapted to tyres intended to equip vehicles of the "SUV" ("Sport Utility Vehicle") type or of the "light truck" type, such as, for example, trucks or vans intended to carry heavy loads.

Advantageously, the load index of the tyre is greater than or equal to 95, preferably greater than or equal to 97, and more preferably greater than or equal to 100.

By virtue of the use of a hybrid reinforcer element comprising a multifilament strand made of aromatic polyamide or aromatic co-polyamide, having a particularly high breaking strength, it is then possible to carry a relatively high load, whilst having a single carcass ply, with this carcass ply having a reasonable density of reinforcer elements and of elastomer composition bridges connecting the properly formed adjacent reinforcer elements.

Advantageously, the load index is less than or equal to 130, preferably less than or equal to 125, and more preferably less than or equal to 121.

Beyond a certain load index, it becomes difficult to obtain tyres with a single carcass ply, in which the density of reinforcer elements remains below a threshold allowing the elastomer composition bridges to be correctly formed.

Advantageously, the nominal inflation pressure is greater than or equal to 200 kPa, preferably greater than or equal to 220 kPa, and more preferably greater than or equal to 250 kPa.

The nominal inflation pressure is the pressure recommended by ETRTO that is considered to be minimal for general use, as defined in the document, "Engineering Design Information", 2017, by ETRTO (European Tyre and Rim Technical Organisation), page C.3.

The higher the nominal inflation pressure, the more sensitive the tyre is to the appearance of very deep sidewall deformations. By virtue of the invention, tyres with such nominal inflation pressures are devoid of sidewall deformations with a depth that is greater than the perception threshold of the human eye, particularly on completion of running-in.

Advantageously, the nominal inflation pressure is less than or equal to 600 kPa, preferably less than or equal to 585 kPa, and more preferably less than or equal to 575 kPa.

Advantageously, the tyre has an aspect ratio ranging from 35 to 95, and preferably from 40 to 80.

The aspect ratio or the nominal aspect ratio is the ratio, expressed as a percentage, of the height of the section of the tyre to the nominal width of the section of the tyre, as defined in the document, "Engineering Design Information", 2017, by ETRTO (European Tyre and Rim Technical Organisation), paragraph D, page GI.5.

Advantageously, the tyre has a nominal rim diameter ranging from 13 to 22 inches, and preferably from 14 to 21 inches.

The nominal rim diameter is the size as defined in the document, "Engineering Design Information", 2017, by ETRTO (European Tyre and Rim Technical Organisation), paragraph D, page GI.5.

Such nominal inflation pressures, such aspect ratios and such nominal rim diameters are particularly suitable for tyres intended to equip vehicles of the "SUV" ("Sport Utility Vehicle") type or of the "light truck" type, such as, for example, trucks or vans intended to carry heavy loads.

Advantageously, the breaking strength of the carcass ply is greater than or equal to 300 daN·cm$^{-1}$, preferably greater than or equal to 380 daN·cm$^{-1}$, and more preferably greater than or equal to 410 daN·cm$^{-1}$. Such carcass ply breaking strengths allow the damages experienced by the tyre in the event of a "pinch shock" type impact, such as, for example, a curb impact or entering a pothole, to be reduced.

The breaking strength of a ply is computed on the basis of a force-extension curve obtained by applying standard ASTM D 885/D 885M-10a (2014) to a reinforcer element of the ply. The breaking strength of the ply is determined by multiplying the breaking strength of the reinforcer element by the number of reinforcer elements per ply cm, with this number being determined in a direction perpendicular to the direction in which the reinforcer elements extend into the ply.

Advantageously, the breaking strength of the reinforcer element ranges from 30 to 45 daN, preferably from 33 to 43 daN, and more preferably from 35 to 41 daN.

The breaking strength of a reinforcer element is measured according to standard ASTM D 885/D 885M-10a (2014).

Advantageously, the diameter d of the reinforcer element is less than or equal to 0.95 mm, preferably less than or equal to 0.80 mm, more preferably less than or equal to 0.70 mm. The reinforcer element extends in a general direction G and the diameter of this reinforcer element is the diameter in which this element is included in a section plane perpendicular to the direction G.

Advantageously, with the carcass ply being obtained from a composite comprising a plurality of reinforcer elements substantially arranged parallel to each other, the thickness Th of the composite is less than or equal to 1.45 mm, preferably less than or equal to 1.30 mm, more preferably less than or equal to 1.20 mm. The thickness of the composite is the shortest distance between the two external surfaces of the composite, i.e. the distance measured in a direction perpendicular to the two external surfaces of the composite.

A composite is understood to be the object comprising the reinforcer elements immersed in a polymeric and preferably elastomeric matrix.

Advantageously, the ratio d/Th of the diameter of the reinforcer element to the thickness of the carcass ply is strictly less than 0.65, preferably less than or equal to 0.62. In one embodiment, the ratio of the diameter of the reinforcer element to the thickness of the carcass ply is more preferably less than or equal to 0.58. Thus, the thickness of the carcass ply and thus the hysteresis of the tyres is reduced in order to reduce the energy consumption of vehicles fitted with such tyres.

Advantageously, with the carcass ply being obtained from a composite comprising a plurality of reinforcer elements arranged substantially parallel to each other, the density of reinforcer elements in the composite ranges from 90 to 130 reinforcer elements per decimetre of composite, preferably from 100 to 125 reinforcer elements per decimetre of composite, and more preferably from 105 to 120 reinforcer elements per decimetre of composite. The density of reinforcer elements is determined by counting the number of reinforcer elements per decimetre in a direction perpendicular to the direction in which the reinforcer elements extend into the composite.

In these reinforcer element density intervals, the carcass ply has a relatively high breaking strength and a relatively low cost, allowing it to be used in tyres suitable for light truck and SUV type vehicles.

Preferably, the tyre is such that the reinforcer element comprises an assembly formed by two multifilament strands.

A "formed assembly" is understood to mean that the assembly does not comprise a multifilament strand other than the two multifilament strands made of aromatic polyamide or aromatic co-polyamide and of polyester.

The multifilament strand made of aromatic polyamide or aromatic co-n polyamide and the multifilament strand made of polyester are assembled together and are helically wound around one another.

In one embodiment, the reinforcer element is twist balanced.

Twist balanced is understood to mean that the two multifilament strands are wound with a substantially identical twist and that the twist of the monofilaments of each multifilament strand, i.e. the twist of the monofilaments of the multifilament strand made of aromatic polyamide or co-polyamide and the twist of the monofilament of the strand made of polyester is substantially zero. Indeed, the method for manufacturing these reinforcer elements, which is well known in the prior art, comprises a first step, during which each yarn of monofilaments is firstly individually twisted over itself (according to an initial twist R1' and R2' with R1'=R2') in a given direction D'=D1'=D2' (respectively the direction S or Z, in accordance with a recognized nomenclature denoting the orientation of the turns along the transverse bar of an S or of a Z), to form a strand, in which the monofilaments undergo a helical deformation around the axis of the strand. Then, during a second step, the two strands are subsequently re-twisted together following a final twist R3, such that R3=R1'=R2' towards D3 opposite the direction D'=D1'=D2' (respectively in the direction Z or S), in order to obtain the reinforcer element ("cord"). This reinforcer element is then said to be twist balanced, since the monofilaments of the two strands have, in the final reinforcer element, the same residual twist, since R1'=R2'. This residual twist is zero or substantially zero, since R3=R1'=R2' and the direction D'=D1'=D2' is opposite the direction D3. A substantially zero residual twist is understood to mean that the residual twist is strictly less than 2.5% of the twist R3.

In another embodiment, the reinforcer element is twist unbalanced.

Twist unbalanced is understood to mean that the two multifilament strands are wound with a different twist and that the twist of the monofilaments of each multifilament strand, i.e. the twist of the monofilaments of the multifilament strand made of aromatic polyamide or co-polyamide and the twist of the monofilaments of the strand made of polyester is non-zero. This reinforcer element comprises a single strand of high modulus textile monofilaments and a single strand of low modulus textile monofilaments wound one around the other in a direction D3 with a twist R3, the strand of high modulus textile monofilaments having a residual twist R1 in the direction D1, the strand of low modulus textile monofilaments has an optional residual twist R2 in the direction D2, with the residual twists R1 and R2 being such that:

R1>R2, when R2 is substantially non-zero;

R1 is substantially non-zero when R2 is substantially zero.

Preferably, the two strands are helically wound one around the other, with the twist factor K of the reinforcer element ranging from 5.2 to 6.5;

with K being defined by the formula $K=(R \times Ti^{1/2})/957$, in which R is the twist of the reinforcer element expressed as revolutions per metre and Ti is the sum of the counts of the multifilament strands of the reinforcer element in tex.

In the selected twist factor interval, for a given count, the reinforcer element for a tyre has a relatively constant breaking strength, which allows the tyre designer to adapt other features of the reinforcer element, in particular the twist, to the use or to the uses for which the tyre is intended. Furthermore, in the selected twist factor interval, the durability of the reinforcer element is compatible with most of the uses of current tyres.

For a given count, the greater the twist, the higher the industrial risk of obtaining significant dispersion of the breaking strength of the reinforcer elements. Thus, compared to reinforcer elements having, for a given count, a high twist factor, i.e. strictly greater than 6.5, the selected twist factor interval allows reinforcer elements to be selected that have a lower twist, and that are therefore liable to lead to less dispersion of the breaking strength of the reinforcer element.

The twist factor, hereafter designated using the letter K (also known as the Twist Multiplier), is defined by the formula:

$$K=(R \times Ti^{1/2})/957,$$

where R is the twist of the reinforcer element expressed as revolutions per metre (twist R3 described in the preamble of the present application) and Ti is the sum of the counts of the multifilament strands of the reinforcer element in tex.

The twist R of the reinforcer element can be measured using any method known to a person skilled in the art, for example, in accordance with standard ASTM D 885/D 885M-10a (2014).

The count (or linear density) of each strand is determined in accordance with standard ASTM D1423. The count is given in tex (weight, in grams, of 1000 m of product—please note: 0.111 tex is equal to 1 denier).

In an advantageous embodiment, the reinforcer element also comprises a layer of an adhesive composition coating the assembly formed by the two strands. Such an adhesive composition is, for example, of the RFL (Resorcinol-Formaldehyde-Latex) type.

Advantageously, the twist factor K of the reinforcer element ranges from 5.2 to 6.3, and preferably from 5.2 to 6.1. Thus, for a given count, the risk of dispersion of the breaking strength of the reinforcer element is reduced even further.

Advantageously, the twist of the reinforcer element ranges from 250 to 405 revolutions per metre, preferably from 250 to 390 revolutions per metre, and even more preferably from 250 to 380 revolutions per metre. For a given count, in this twist interval, the reinforcer element is durable enough to be used in a tyre suitable for vehicles of the light truck and SUV type and has a relatively low risk of dispersion of its breaking strength.

Advantageously, the count of the multifilament strand made of aromatic polyamide or aromatic co-polyamide ranges from 140 to 210 tex, preferably from 150 to 190 tex, more preferably from 160 to 180 tex. In the twist factor interval according to the invention, using counts below the intervals described above, the reinforcer element would have a relatively high twist, which would lead to a risk of dispersion of the breaking strength. Conversely, in the twist factor interval according to the invention, by using counts above the intervals described above, the reinforcer element would have a relatively low twist rate, which would lead to a risk of reducing the durability. Thus, the count intervals of the multifilament strand made of aromatic polyamide or aromatic co-polyamide described above preferably allow a good breaking strength-durability compromise to be obtained.

Advantageously, the count of the multifilament strand made of polyester ranges from 100 to 210 tex, preferably from 120 to 190 tex, and more preferably from 130 to 180 tex. In one embodiment, the count of the multifilament strand made of polyester more preferably still ranges from 160 to 180 tex. In a similar way to the count of the multifilament strand made of aromatic polyamide or aromatic co-polyamide, in the intervals of the counts of the multifilament strand made of polyester described above, the reinforcer element preferably has a good breaking strength-durability compromise.

In a first alternative embodiment of the reinforcer element, the twist factor K ranges from 5.2 to 5.5, preferably from 5.3 to 5.5, and even more preferably from 5.3 to 5.4.

In this first alternative embodiment, the twist of the reinforcer element advantageously ranges from 250 to 340 revolutions per metre, preferably from 260 to 325 revolutions per metre, more preferably from 275 to 305 revolutions per metre.

In a second alternative embodiment of the reinforcer element, the twist factor K ranges from 5.5 to 6.5, preferably forming part of the interval ]5.5; 6.5] (i.e. excluding the value 5.5), preferably from 5.6 to 6.1, and even more preferably from 5.9 to 6.1.

In this second alternative embodiment, the twist of the reinforcer element advantageously ranges from 275 to 365 revolutions per metre, preferably from 275 to 350 revolutions per metre, more preferably from 300 to 330 revolutions per metre.

In each first and second alternative embodiment, for a given count, in this twist interval, the durability of the reinforcer element is sufficient to be used in a tyre suitable for most current uses and with a relatively low risk of dispersion of its breaking strength.

First Embodiment of the Tyre According to the Invention

In a first embodiment, the invention is applicable to a tyre intended to be fitted on vehicles of the "light truck" type, such as, for example, trucks or vans intended to carry heavy loads.

In this first embodiment, the sidewall height ranges from 139 to 223 mm, and preferably from 139 to 200 mm.

In this first embodiment, the load index ranges from 100 to 125, and preferably from 102 to 121.

In this first embodiment, the nominal inflation pressure ranges from 425 kPa to 575 kPa, preferably from 450 kPa to 550 kPa, and more preferably from 475 kPa to 525 kPa.

Such an inflation pressure is high enough to carry heavy loads, which is a frequent use for the tyres intended to be fitted on vehicles of the light truck type.

In this first embodiment, the aspect ratio ranges from 50 to 85, preferably from 60 to 80, and more preferably from 65 to 75.

In this first embodiment, the nominal rim diameter ranges from 14 to 20 inches, preferably from 15 to 19 inches, and more preferably from 15 to 17 inches.

Finally, on the one hand, in order to avoid excessively raising the vehicle and thus facilitate its loading and, on the other and, to allow heavy loads to be carried, it is preferable for the nominal rim diameter to range from 15 to 17 inches.

Second Embodiment of the Tyre According to the Invention

In a second embodiment, the invention is applicable to a tyre intended to be fitted on vehicles of the "SUV" ("Sport Utility Vehicle") type.

In this second embodiment, the sidewall height is less than or equal to 141 mm.

In this second embodiment, the load index ranges from 100 to 115, and preferably from 100 to 105.

In this second embodiment, the nominal inflation pressure ranges from 175 kPa to 425 kPa, preferably from 200 kPa to 350 kPa, and more preferably from 220 kPa to 300 kPa.

In this second embodiment, the aspect ratio ranges from 35 to 70, preferably from 40 to 65, and more preferably from 50 to 60. In this second embodiment, the nominal rim diameter ranges from 17 to 22 inches, preferably from 17 to 20 inches, and more preferably from 17 to 19 inches.

In order to, on the one hand, allow the bodywork of the vehicle to be sufficiently raised to overcome obstacles and, on the other hand, to have a size that is in harmony with the size of the vehicle on which it is intended to be fitted, it is preferable for the nominal rim diameter to range from 17 to 19 inches.

In one embodiment, with each bead comprising at least one annular reinforcement structure, the radial carcass reinforcement is anchored in each of the beads by a turn-up around the annular reinforcement structure.

In another embodiment, the crown reinforcement comprises a working reinforcement comprising at least one, and preferably two, working plies. Optionally, each working ply comprises a plurality of working reinforcer elements, preferably made of metal, arranged side-by-side, substantially parallel to one another. Such working reinforcer elements form an angle ranging from 10° to 45° with the circumferential direction of the tyre. Advantageously, when the working reinforcement comprises two working plies, the working reinforcer elements are crossed from one working ply to the other.

Preferably, the crown reinforcement comprises a hoop reinforcement radially disposed outside the working reinforcement. Advantageously, the hoop ply comprises one or more hoop reinforcer elements, preferably textile, arranged side-by-side, substantially parallel to each other. Such hoop reinforcer elements form an angle at most equal to 10°, preferably ranging from 5° to 10°, with the circumferential direction of the tyre.

In the present application, textile is very generally understood to be any material made of a material other than metal, whether it is natural, such as synthetic, liable to be converted into wire, fibre or film using any suitable transformation method. It is possible to cite, for example, without the following examples being limiting, a polymer spinning method, such as, for example, melt spinning, solution spinning or gel spinning.

Even though materials made of non-polymeric material (for example, made of mineral material, such as glass, or made of non-polymeric organic material, such as carbon) are included in the definition of textile material, the invention is preferably implemented with materials made of polymeric material, both of the thermoplastic type and of the non-thermoplastic type.

The following can be cited by way of examples of polymeric materials, of the thermoplastic or non-thermoplastic type, for example: celluloses, in particular rayon, polyvinyl alcohols ("PVA"), polycetones, aramides (aromatic polyamides), aromatic polyesters, polybenzazoles ("PBO"), polyimides, polyesters, in particular those selected from PET (polyethylene terephthalate), PEN (polyethylene naphthalate), PBT (polybutylene terephthalate), PBN (polybutylene naphthalate), PPT' (polypropylene terephthalate), PPN (polypropylene naphthalate).

In some embodiments, the carcass ply is obtained from a composite by shaping a green form tyre. In these embodiments, a shaping cylinder is provided that has a general toroidal shape about an axis of the cylinder, with the cylinder having an installation surface, with a composite comprising the one or more reinforcer elements immersed in an elastomer matrix in the raw state, i.e. non-cross-linked, being wound in contact with said installation surface, which then forms an axially and circumferentially continuous cylindrical winding. The composite can be installed directly in contact with the installation surface or even on a radially internal ply, for example, a sealing ply, which is wound in contact with the installation surface. In most of the embodiments, the composite is deposited by a single cylindrical winding revolution. Optionally, other plies are arranged on the composite.

Then, the installation surface is radially separated from the axis of the cylinder, for example, by pressurization using a gas for inflating an annular space inside the installation surface, for example, with air. This step is called shaping since the green form is deformed so as to obtain a shape that is adapted to the subsequent installation of the crown reinforcement and of the tread. This shaping will vary the density of the reinforcer element of the carcass ply obtained from the composite depending on whether or not it is located in the bead or radially under the crown reinforcement. This then yields a shaped tyre green form.

Subsequently, the crown reinforcement and the tread are arranged on the shaped tyre green form.

Finally, the installation surface is radially caused to approach the axis of the cylinder, for example, by depressurizing the annular space.

The tyre is then obtained in the raw state. Finally, the tyre is cross-linked, for example, by vulcanization, in order to obtain the tyre in the raw state.

A further aim of the invention is a method for running-in a tyre, in which the tyre according to the invention is run-in.

Running-in is understood to mean running-in the tyre for a certain duration under certain conditions, with this duration and these conditions particularly depending on the load, the speed and the driving style of the driver. This running-in period will allow the depth of the deformations in the sidewall of the tyre to drop below the perception threshold of the eye. Thus, during this running-in period, it can be seen that the tyre according to the invention has a deformation depth in the sidewall, the reduction of which can reach 25% compared to the new tyre.

BRIEF DESCRIPTION OF THE DRAWINGS

The invention will be better understood in light of the following description, which is provided solely by way of a non-limiting example, and is provided with reference to the drawings, in which:

FIG. 8 is an exploded section view of the reinforcer element of the carcass ply of the tyre of FIG. 4a.

DETAILED DESCRIPTION

A "radial cross section" or "radial section" is understood herein to be a cross section or a section in a plane that contains the axis of rotation of the tyre.

The "median circumferential plane" M of the tyre is the plane that is normal to the axis of rotation of the tyre and that is located equidistantly from the annular reinforcement structures of each bead.

The "equatorial circumferential plane" E of the tyre is the theoretical plane passing through the equator of the tyre, perpendicular to the median plane and to the radial direction. The equator of the tyre is, in a circumferential section plane (the plane perpendicular to the circumferential direction and parallel to the radial and axial directions), the axis parallel to the axis of rotation of the tyre and located equidistantly between the radially outermost point of the tread that is intended to be in contact with the ground and the radially innermost point of the tyre that is intended to be in contact with a support, for example, a rim, with the distance between these two points being equal to H.

An "axial" direction is a direction parallel to the axis of rotation of the tyre.

A "circumferential" direction is a direction that is perpendicular both to a radius of the tyre and to the axial direction.

In the present application, unless otherwise indicated, any interval of values designated by the term "from a to b" signifies the range of values ranging from the limit "a" to the limit "b", i.e. including the strict limits "a" and "b".

Tyre According to a First Embodiment of the Invention

Figure 4A:
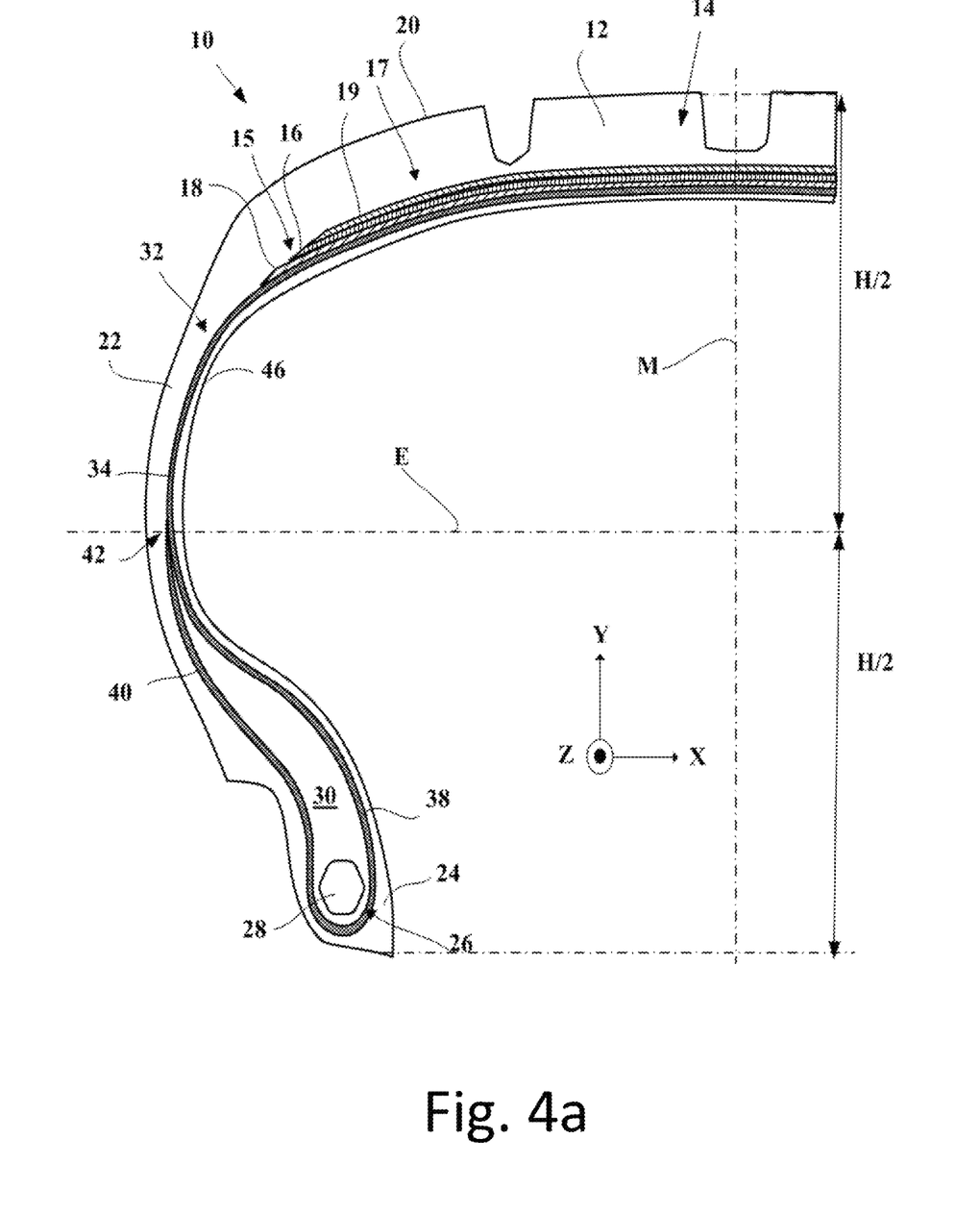
FIG. 4a is a radial section view of a tyre according to a first embodiment of the invention.

FIG. 4a shows an X, Y, Z coordinate system corresponding to the common directions, respectively axial (X), radial (Y) and circumferential (Z), of a tyre.

Architecture of the Tyre

FIG. 4a schematically shows a radial section view of a tyre according to a first embodiment of the invention and designated using general reference sign 10. The tyre 10 substantially rotates about an axis substantially parallel to the axial direction X.

The sidewall height of the tyre 10 is greater than or equal to 110 mm, even greater than or equal to 120 mm, preferably greater than or equal to 130 mm, and even more preferably greater than or equal to 140 mm, and less than or equal to 220 mm, preferably less than or equal to 210 mm, and even more preferably less than or equal to 200 mm. The load index of the tyre 10 is greater than or equal to 94, even greater than or equal to 95, preferably greater than or equal to 97, and more preferably greater than or equal to 100, and less than or equal to 130, preferably less than or equal to 125, and more preferably less than or equal to 121. The nominal inflation pressure of the tyre 10 is greater than or equal to 200 kPa, preferably greater than or equal to 220 kPa, and more preferably greater than or equal to 250 kPa, and less than or equal to 600 kPa, preferably less than or equal to 585 kPa, and more preferably less than or equal to 575 kPa. The aspect ratio of the tyre 10 ranges from 35 to 95, and preferably from 40 to 80. The nominal rim diameter of the tyre 10 ranges from 13 to 22 inches, and preferably from 14 to 21 inches.

In this first embodiment, the tyre 10 in this case is intended for a light truck type vehicle and the size of said tyre is 215/75 R16 113/111R.

Thus, the sidewall height of the tyre 10 ranges from 139 to 223 mm, and preferably from 139 to 200 mm, and in this case is equal to 161 mm. The load index ranges from 100 to 125, and preferably from 102 to 121, and in this case is equal to 113/111. The nominal inflation pressure ranges from 425 kPa to 575 kPa, preferably from 450 kPa to 550 kPa, and more preferably from 475 kPa to 525 kPa, and in this case is equal to 475 kPa. The aspect ratio ranges from 50 to 85, preferably from 60 to 80, and more preferably from 65 to 75, and in this case is equal to 75. The nominal rim diameter ranges from 14 to 20 inches, preferably from 15 to 19 inches, and more preferably from 15 to 17 inches, and in this case is equal to 16 inches.

The tyre 10 comprises a crown 12 comprising a crown reinforcement 14 comprising a working reinforcement 15 comprising two working plies 16, 18 of working reinforcer elements and a hoop reinforcement 17 comprising a hoop ply 19 of hoop reinforcer elements. The crown reinforcement 14 extends into the crown 12 in the circumferential direction Z of the tyre 10. The crown 12 comprises a tread 20 radially arranged outside the crown reinforcement 14. In this case, the hoop reinforcement 17, in this case the hoop ply 19, is radially inserted between the working reinforcement 15 and the tread 20.

The tyre 10 also comprises two sidewalls 22 extending the crown 12 radially inwards. The tyre 10 further comprises two beads 24 radially inside the sidewalls 22 and each comprising an annular reinforcement structure 26, in this case a bead wire 28, overmounted by a bead gum mass 30 on the bead wire, as well as a radial carcass reinforcement 32. Each sidewall 22 connects each bead 24 to the crown 12.

The carcass reinforcement 32 comprises a carcass ply 34 comprising a plurality of reinforcer elements, the carcass ply 34 being anchored to each of the beads 24 by a turn-up around the bead wire 28, so as to form, in each bead 24, an outgoing strand 38 extending from the beads through the sidewalls towards the crown 12, and an incoming bead 40, the radially external end 42 of the incoming bead 40 being radially outside the annular reinforcement structure 26. The carcass reinforcement 32 thus extends from the beads 24 into and through the sidewalls 22 up to the crown 12. The carcass reinforcement 32 is radially arranged inside the crown reinforcement 14 and the hoop reinforcement 17. The crown reinforcement 14 therefore is radially inserted between the carcass reinforcement 32 and the tread 20. The carcass reinforcement 32 comprises a single carcass ply 34, which in this case is formed by the carcass ply 34.

The carcass reinforcement 32 is radial in each sidewall 22 and in the crown 12. Thus, each reinforcer element forms an angle ranging from 80° to 90° with the circumferential direction of the tyre 10 in the median M and equatorial E planes of the tyre 10.

The tyre 10 also comprises an internal sealing layer 46, preferably made of butyl, axially located inside the sidewalls 22 and radially located inside the crown reinforcement 14 and extending between the two beads 24.

Each working ply 16, 18, hoop ply 19 and carcass ply 34 comprises a polymeric composition, in which reinforcer elements of the corresponding ply are immersed. Each polymeric composition, in this case an elastomeric composition, of the working 16, 18, hoop 19 and carcass 34 plies is made from a conventional composition for calendering reinforcer elements conventionally comprising a diene elastomer, for example, natural rubber, a reinforcing filler, for example, carbon black and/or silica, a cross-linking system, for example, a vulcanization system, preferably comprising sulphur, stearic acid and zinc oxide, and optionally an accelerator and/or vulcanization inhibitor and/or various additives.

Carcass Ply of the Tyre 10

Figure 5:
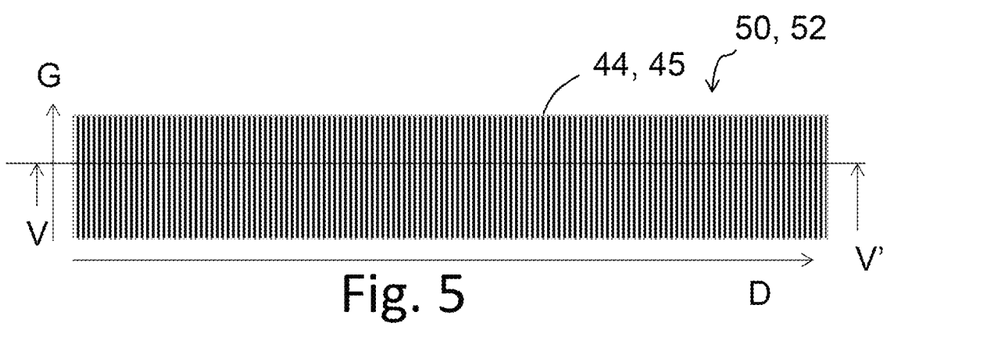
FIG. 5 illustrates a section view of a composite intended to form the carcass ply of each tyre of FIGS. 4a and 4b.
Figure 6:
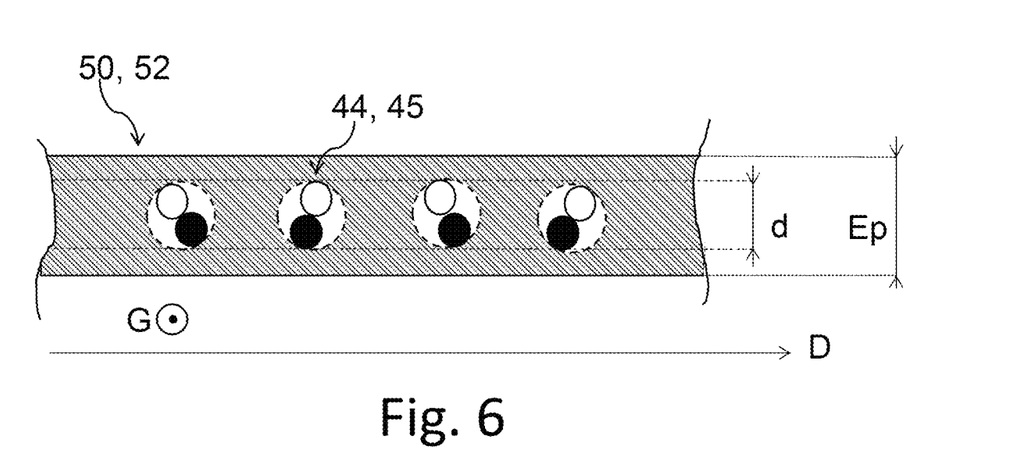
FIG. 6 illustrates a section view of the carcass ply of FIG. 5 along the V-V' plane.

FIGS. 5 and 6 will now be referred to in order to describe a composite 50 intended to form the carcass ply 34 of the tyre 10.

The composite 50 comprises a plurality of reinforcer elements 44. The reinforcer elements 44 are arranged side-by-side parallel to each other in a main direction D substantially perpendicular to the general direction G along which the reinforcer elements of the composite 50 extend, with the general direction G forming, once the composite 50 forming the carcass ply 34 is inside the tyre 10, an angle ranging from 80° to 90° with the circumferential direction Z of the tyre 10. In this case, the general direction G forms, once the composite 50 forming the carcass ply 34 is inside the tyre 10, an angle substantially equal to 90° with the circumferential direction Z of the tyre 10.

The density of reinforcer elements 44 in the composite 50 ranges from 90 to 130 reinforcer elements per decimetre of composite 50, preferably from 100 to 125 reinforcer elements per decimetre of composite 50, more preferably from 105 to 120 reinforcer elements per decimetre of composite 50, and in this case is equal to 110 reinforcer elements per decimetre of composite 50.

The thickness Th of the composite 50 is less than or equal to 1.45 mm, and preferably less than or equal to 1.30 mm, and in this case is equal to 1.28 mm.

The density of reinforcer elements and the thickness Th described above are, as previously explained, the density of reinforcer elements 44 and the thickness Th of the composite 50. In the tyre 10, with the carcass ply 34 being obtained from the composite 50 by shaping a tyre green form, the density of reinforcer elements, as well as the thickness Th of the carcass ply 34 differ from those of the composite and vary depending on the proximity to or from the axis of rotation of the tyre. These variations are particularly dependent on the degree of shaping of the green form of the tyre, but also on its geometry. Particularly on the basis of the degree of shaping of the green form of the tyre and of its geometry, a person skilled in the art would be able to determine the features of the corresponding composite.

The diameter d of the reinforcer element is less than or equal to 0.95 mm, preferably less than or equal to 0.80 mm, more preferably less than or equal to 0.70 mm, and in this case is equal to 0.67 mm.

The ratio d/Th is strictly less than 0.65, preferably less than or equal to 0.62, and in this case is equal to 0.52.

The breaking strength of the carcass ply is greater than or equal to 300 daN·cm$^{-1}$, preferably greater than or equal to 380 daN·cm$^{-1}$, and more preferably greater than or equal to 410 daN·cm$^{-1}$, and in this case is equal to 440 daN·cm$^{-1}$.

Reinforcer Elements of the Carcass Ply of the Tyre 10

Figure 7:
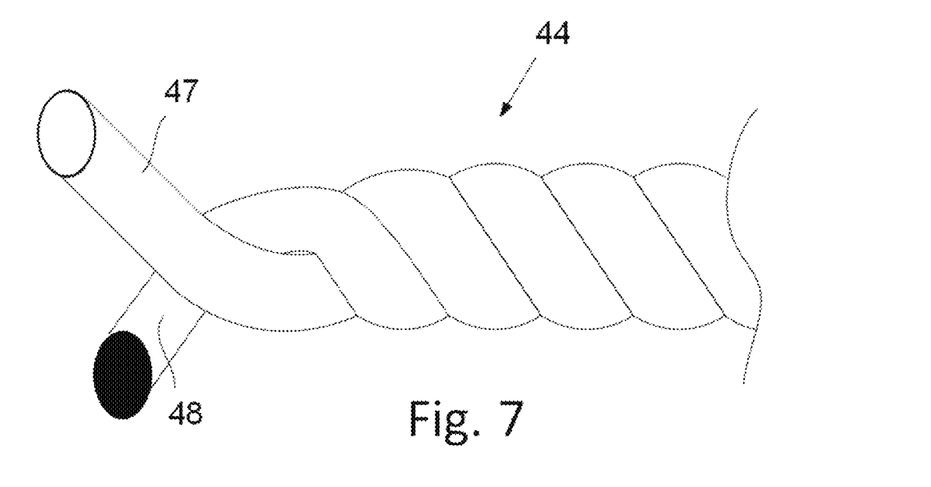
FIG. 7 is a schematic representation of the structure of the reinforcer elements of each carcass ply of each tyre of FIGS. 4a and 4b.
Figure 8:
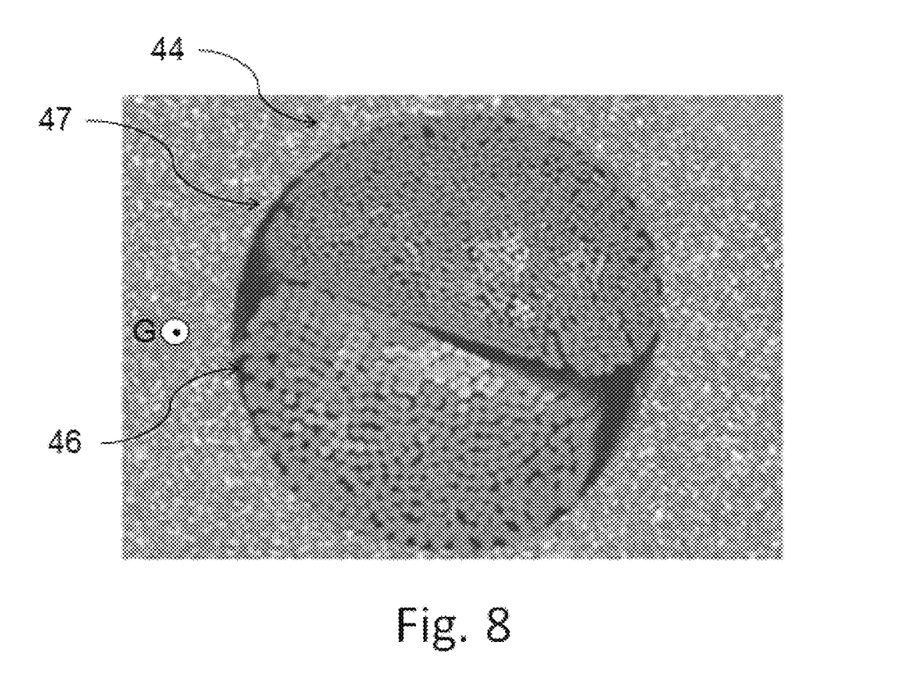

As schematically shown in FIG. 7, the reinforcer element 44 comprises an assembly formed by a multifilament strand 47 made of aromatic polyamide or aromatic co-polyamide and a multifilament strand 48 made of polyester, the two strands 47, 48 being helically wound around each other. The reinforcer element 44 is twist balanced. For the sake of the accuracy of the description, FIG. 8 is a section view of the reinforcer element 44 and distinguishes the monofilaments of each of the strands.

The selected aromatic polyamide in this instance preferably is a para-aramid known by the Teijin company trade name of Twaron 1000. The polyester is polyethylene terephthalate (PET), known by the Hyosung or Hailide company trade name of PET HMLS (High Modulus Low Shrinkage).

In some embodiments, not shown, the reinforcer element 44 comprises one or more layers of an adhesive composition coating the assembly.

Count of the Reinforcer Element 44

The count of the multifilament strand 47 made of aromatic polyamide or aromatic co-polyamide ranges from 140 to 210 tex, preferably from 150 to 190 tex, more preferably from 160 to 180 tex. In the first embodiment, the count of the strand 47 of the reinforcer element 44 is equal to 167 tex.

The count of the multifilament strand 48 made of polyester ranges from 100 to 210 tex, preferably from 120 to 190 tex, more preferably from 130 to 180 tex. In the first embodiment, the count of the strand 48 of the reinforcer element 44 is equal to 167 tex.

Twist of the Reinforcer Element 44

The twist R of the reinforcer element 44 ranges from 250 to 405 revolutions per metre, preferably from 250 to 390 revolutions per metre, more preferably from 250 to 380 revolutions per metre. In the first embodiment, the twist of the reinforcer element advantageously ranges from 275 to 365 revolutions per metre, preferably from 275 to 350 revolutions per metre, more preferably from 300 to 330 revolutions per metre, and in this case is equal to 315 revolutions per metre.

Twist Factor of the Reinforcer Element 44

The twist factor K of the reinforcer element 44 ranges from 5.2 to 6.5, preferably from 5.2 to 6.3, more preferably from 5.2 to 6.1.

In the first embodiment, the twist factor K of the reinforcer element 44 is equal to $315 \times (167+167)^{1/2}/957 = 6.0$.

The breaking strength of the reinforcer element 44 ranges from 30 to 45 daN, preferably from 33 to 43 daN, and more preferably from 35 to 41 daN, and in this case is equal to 40 daN.

Method for Manufacturing the Reinforcer Element 44

As previously described, each reinforcer element 44 is twist balanced, i.e. the two multifilament strands are wound with a substantially identical twist and the twist of the monofilaments of each multifilament strand is substantially zero. In a first step, each yarn of monofilaments is firstly individually twisted on itself following an initial twist equal to 315 revolutions per metre in a given direction, in this case the direction Z, in order to form a strand. Then, during a second step, the two strands are subsequently re-twisted together following a final twist equal to 315 revolutions per metre in the direction S, in order to obtain the assembly of the reinforcer element ("cord"). In subsequent steps, each assembly is coated with an adhesive composition, for example, an adhesive composition of the RFL (Resorcinol-Formaldehyde-Latex) type, and undergoes heat treatment steps in order to at least partly cross-link the adhesive composition.

Method for Manufacturing the Carcass Ply 34

In order to obtain the carcass ply 34, the composite 50 is firstly manufactured by immersing a plurality of reinforcer elements 44 in an elastomer composition, for example, by calendering. During such a calendering step, which is well known to a person skilled in the art, reinforcer elements are unwound and two strips, called skims, made from an elastomer composition are moved to either side of the reinforcer elements, in order to sandwich the reinforcer elements between the two skims. Thus, the reinforcer elements are immersed in the elastomer composition.

Method for Manufacturing the Tyre 10

The method for manufacturing the tyre is that which is conventionally used by a person skilled in the art. During this method, and as already previously described, various composites, including the composite 50 intended to form the carcass ply 34, are successively provided during a first series of assembly steps. The green form that is thus obtained is then shaped. Subsequently, other composites are provided that are intended to form the plies 16, 18, 19 of the crown 12 of the tyre 10. Finally, the green form that is thus obtained is vulcanized in order to obtain the tyre 10.

Tyre According to a Second Embodiment of the Invention

Figure 4B:
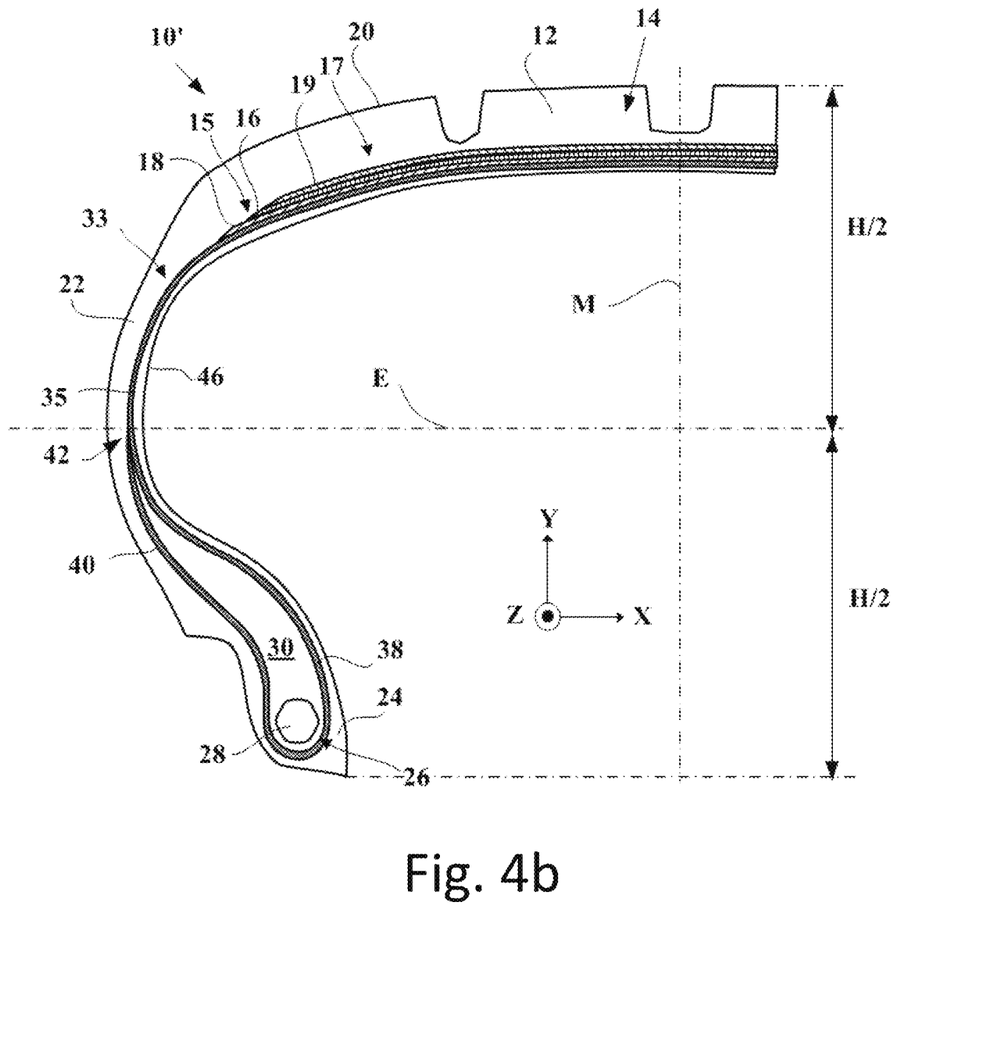
FIG. 4b is a radial section view of a tyre according to a second embodiment of the invention.

FIG. 4*b* shows a tyre 10' according to a second embodiment of the invention. The elements that are similar to those of the first embodiment are designated using identical reference signs, with the exception of the composite 52, the carcass reinforcement 33, the carcass ply 35 and the reinforcer element 45. For the sake of brevity, only the differences relative to the first embodiment will be described.

Unlike the tyre 10 according to the first embodiment, the tyre 10' according to the second embodiment in this case is intended for a vehicle of the SUV type and has a 255/50 R19 107W tyre size.

Thus, the sidewall height of the tyre 10' is less than or equal to 141 mm, and in this case is equal to 128 mm. The load index ranges from 100 to 115, and preferably from 100 to 105, and in this case is equal to 107. The nominal inflation pressure ranges from 175 kPa to 425 kPa, preferably from 200 kPa to 350 kPa, and more preferably from 220 kPa to 300 kPa, and in this case is equal to 290 kPa. The aspect ratio ranges from 35 to 70, preferably from 40 to 65, and more preferably from 50 to 60, and in this case is equal to 50. The nominal rim diameter ranges from 17 to 22 inches, preferably from 17 to 20 inches, and more preferably from 17 to 19 inches, and in this case is equal to 19 inches.

Carcass Ply of the Tyre 10'

The density of reinforcer elements 45 in the composite 52 in this case is equal to 116 reinforcer elements per decimetre of composite 52. The thickness Th of the composite 52 is less than or equal to 1.45 mm, preferably less than or equal to 1.30 mm, more preferably less than or equal to 1.20 mm, and in this case is equal to 1.16 mm. The diameter d of the reinforcer element 45 is equal to 0.65 mm. The ratio d/Th in this case is equal to 0.56.

The breaking strength of the carcass ply 33 in this case is equal to 430 daN·cm$^{-1}$.

Reinforcer Elements of the Carcass Ply of the Tyre 10'

The count of the strand 47 of the reinforcer element 45 is also equal to 167 tex and the count of the strand 48 of the reinforcer element 45 is equal to 144 tex.

In this second embodiment, the twist of the reinforcer element 45 ranges from 250 to 340 revolutions per metre, preferably from 260 to 325 revolutions per metre, more preferably from 275 to 305 revolutions per metre, and in this case is equal to 290 revolutions per metre.

In this second embodiment, the twist factor K ranges from 5.2 to 5.5, preferably from 5.3 to 5.5, and even more preferably from 5.3 to 5.4, and in this case is 5.3.

The breaking strength of the reinforcer element 45 in this case is equal to 37 daN.

Method for Manufacturing the Reinforcer Element 45, the Carcass Ply 35 and the Tyre 10'

The assembly of the reinforcer element 45 is manufactured, mutatis mutandis, relative to the reinforcer element 44 by applying a twist that is equal to 290 revolutions per metre.

The methods for manufacturing the carcass ply 35 and the tyre 10' are deduced, mutatis mutandis, from those previously described in the first embodiment.

Measures and Comparative Tests

Table 1 summarizes the features of the reinforcer elements 44, 45, respectively, of the tyres 10, 10' according to the invention, and of the reinforcer element ET of a tyre of the prior art and of a reinforcer element EC of a comparative tyre. The features of the corresponding composites CT, CC, 50 and 52 are also collated.

TABLE 1

|  | Reinforcer element | | | |
| --- | --- | --- | --- | --- |
|  | ET | EC | 44 | 45 |
| Type of strands | PET/PET | PET/PET | p-Aramid/PET | p-Aramid/PET |
| Twist (r/m) | 420 | 270 | 315 | 290 |
| Count of the strands (tex) | 144/144 | 334/334 | 167/167 | 167/144 |
| Twist factor K | 7.4 | 7.3 | 5.9 | 5.3 |
| Breaking strength (daN) | 19 | 40 | 40 | 37 |
| Composite | CT | CC | 50 | 52 |
| Density (threads/dm) | 123 | 80 | 110 | 116 |
| Th (mm) | 1.17 | 1.47 | 1.28 | 1.16 |
| d (mm) | 0.62 | 0.96 | 0.67 | 0.65 |
| d/Th | 0.53 | 0.65 | 0.52 | 0.56 |
| Breaking strength (daN/cm) | 228 | 328 | 440 | 430 |

Comparison of the Tyres

Table 2 summarizes the features of the tyres 10, 10' of the first and second embodiments according to the invention, of a tyre PT' of the prior art having two carcass plies each formed by a composite CT and a tyre PC' having a single carcass ply formed by a composite CC.

TABLE 2

|  | PT | PT' | PC' | 10 | 10' |
| --- | --- | --- | --- | --- | --- |
| Tyre designation | 215/75 R16 113/111R | 255/50 R19 107W | 255/50 R19 107W | 215/75 R16 113/111R | 255/50 R19 107W |
| Number of carcass plies | 2 × CT | 2 × CT | 1 × CC | 1 × 50 | 1 × 52 |
| Sidewall height (mm) | 161 | 128 | 128 | 161 | 128 |
| Load index | 113/111 | 107 | 107 | 113/111 | 107 |
| Nominal inflation pressure (kPa) | 475 | 290 | 290 | 475 | 290 |
| Aspect ratio | 75 | 50 | 50 | 75 | 50 |
| Nominal rim diameter (inches) | 16 | 19 | 19 | 16 | 19 |

Firstly, on the one hand, the masses of the tyres PT and 10 and, on the other hand, the masses of the tyres PT', PC' and 10' were compared by weighing the tested tyres. The results are indicated as a base 100 compared to the tyres PT and PT'. A mass of less than 100 means that the tyre is lighter relative to the reference tyre PT or PT'.

The deformation depth in the sidewall of the tyres PT, PT', PC', 10 and 10' was also compared before and after running-in. The deformation depth in the initial sidewall is measured on a new tyre before running-in. The deformation depth in the sidewall after running-in is determined by running each tested tyre over a determined distance and at a determined speed, in this case 200 km at 100 km/h at a pressure of 400 kPa.

The deformation depth in the sidewall is measured using a measuring gauge, for example, made by AKRON, which is positioned on a suitable and relevant zone of the tyre. The measurement is preferably taken on the zone at the equator.

The results of these various tests are collated in Table 3 below.

TABLE 3

|  | PT | PT' | PC' | 10 | 10' |
| --- | --- | --- | --- | --- | --- |
| Initial sidewall deformation (μm) | 320 | 250 | 300 | 580 | 700 |
| Sidewall deformation after running-in (μm) | 432 | 340 | 350 | 377 | 520 |
| Evolution of the deformation (%) | +35% | +36% | +17% | −35% | −26% |
| Mass | 100 | / | / | 94 | / |
| Mass | / | 100 | 96 | / | 94 |

The tyre 10 has a reduced mass compared to the tyre PT and nevertheless allows an equivalent load to be carried despite the presence of a single carcass ply.

It is to be noted that the tyre 10' has a reduced mass compared to the tyres PT' and PC'. The tyre 10', by virtue of a carcass ply according to the invention, allows a higher load to be carried than the tyre PC' and higher than the tyre PT', yet without requiring the use of two carcass plies.

The deformation depth of the tyre 10' according to the invention in the sidewall diminishes by 26% after running-in. It can be seen that the deformation depth in the sidewall of the tyre PT' of the prior art increases by 35% after running-in at an equivalent load index. Furthermore, even though the deformation depth of the tyre 10' in the sidewall exceeds the perception threshold of the human eye on completion of its manufacturing method, after running-in, it can be seen that the deformation depth in the sidewall of the tyre 10' significantly decreases, then dropping below the perception threshold of the human eye, whereas the deformation depth in the sidewall of the tyre PT' will significantly increase.

Unlike the tyre 10', the tyre 10 has a sidewall deformation depth that is below the perception threshold of the human eye before running-in, but nevertheless is relatively close to this threshold. As is the case for the tyre 10' after running-in, it can be seen that the deformation depth in the sidewall of the tyre 10 significantly decreases, in order to reach a value that is significantly below the perception threshold of the human eye, whereas the deformation depth in the sidewall of the tyre PT will significantly increase.

The difference in the deformation depth of the sidewall of the tyres 101 and 102 was also tested, with said tyres being architecturally similar to the tyre 10, except that the composites forming these tyres have the following features, collated in table 4 below:

TABLE 4

|  | Reinforcer element | | |
|---|---|---|---|
|  | 44 | 441 | 442 |
| Type of strands | p-Aramid/PET | p-Aramid/PET | p-Aramid/PET |
| Twist (r/m) | 315 | 325 | 290 |
| Count of the strands (tex) | 167/167 | 167/144 | 167/144 |
| Twist factor K | 5.9 | 6.0 | 5.3 |
| Composite | 50 | 50 | 50 |
| Density (threads/dm) | 110 | 116 | 116 |
| Tyre | 10 | 101 | 102 |
| Initial sidewall deformation (μm) | 580 | 747 | 581 |
| Sidewall deformation after running-in (μm) | 377 | 538 | 482 |
| Evolution of the deformation (%) | −35% | −28% | −17% |

It can be seen that, by varying the count and the twist for the same tyre architecture, after running-in, as for the tyre 10, the deformation depth in the sidewall of the tyres 101 and 102 decreases, in order to reach a value below the perception threshold of the human eye.

Thus, as demonstrated by the above comparative tests, the invention involves a tyre with a sidewall height that is greater than or equal to 110 mm and a load index that is greater than or equal to 94 and involves combining a single carcass ply and a hybrid reinforcer element, allowing the tyre to be lightened, whilst making the deformations of sidewalls invisible to the client after a running-in period.

The invention is not limited to the previously described embodiments.

It will also be possible to combine the features of the various embodiments and alternative embodiments described or contemplated above, provided that these features are compatible with one another.

The invention claimed is:

1. A tire comprising a crown comprising a tread and a crown reinforcement, two sidewalls, two beads, with each sidewall connecting the respective bead to the crown, the crown reinforcement extending into the crown in a circumferential direction of the tire, the tire comprising a radial carcass reinforcement anchored in each of the beads and extending into the sidewalls, the crown reinforcement being radially inserted between the carcass reinforcement and the tread, the tire having a sidewall height that is greater than or equal to 110 mm, a nominal inflation pressure ranging from 425 kPa to 575 kPa, and a load index that is greater than or equal to 100,
wherein the radial carcass reinforcement is a single carcass ply having a breaking strength greater than or equal to 300 daN·cm$^{-1}$, the carcass ply formed of a composite comprising a plurality of reinforcer elements, and wherein each reinforcer element has a breaking strength ranging from 30 to 45 daN and comprises an assembly formed by a plurality of multifilament strands comprising:
at least one multifilament strand made of aromatic polyamide or aromatic co-polyamide; and
at least one multifilament strand made of polyester.

2. The tire according to claim 1, wherein the sidewall height is greater than or equal to 120 mm.

3. The tire according to claim 1, wherein the sidewall height is less than or equal to 220 mm.

4. The tire according to claim 1, wherein the sidewall height ranges from 139 to 223 mm.

5. The tire according to claim 1, wherein the sidewall height is less than or equal to 141 mm.

6. The tire according to claim 1, wherein the load index is less than or equal to 130.

7. The tire according to claim 1, wherein the tire has an aspect ratio ranging from 35 to 95.

8. The tire according to claim 1, wherein the tire has an aspect ratio ranging from 50 to 85.

9. The tire according to claim 1, wherein the tire has a nominal rim diameter ranging from 13 to 22 inches.

10. The tire according to claim 1, wherein the tire has a nominal rim diameter ranging from 14 to 20 inches.

11. The tire according to claim 1, wherein the tire has a nominal rim diameter ranging from 17 to 22 inches.

12. The tire according to claim 1, wherein the reinforcer element assembly is formed by two multifilament strands.

13. The tire according to claim 12, wherein, with the two multifilament strands being helically wound around one another, the twist factor K of the reinforcer element ranges from 5.2 to 6.5, with K being defined by the formula $K=(R \times Ti^{1/2})/957$, in which R is a twist of the reinforcer element expressed as revolutions per meter and Ti is a sum of the counts of the multifilament strands of the reinforcer element in tex.

14. A method for running-in a tire comprising the step of running-in the tire according to claim 1.

* * * * *